United States Patent
Amhoud et al.

(10) Patent No.: US 10,218,442 B2
(45) Date of Patent: Feb. 26, 2019

(54) SPACE-TIME CODING METHODS AND DEVICES FOR OPTICAL MIMO SYSTEMS

(71) Applicant: INSTITUT MINES-TELECOM, Paris (FR)

(72) Inventors: El-Mehdi Amhoud, Paris (FR); Ghaya Rekaya Ben-Othman, Antony (FR); Yves Jaouen, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/593,402

(22) Filed: May 12, 2017

(65) Prior Publication Data

US 2017/0331553 A1    Nov. 16, 2017

(30) Foreign Application Priority Data

May 13, 2016 (EP) .................................... 16305565

(51) Int. Cl.
     *H04B 10/00*      (2013.01)
     *H04B 10/2581*      (2013.01)
     (Continued)

(52) U.S. Cl.
     CPC ....... *H04B 10/2581* (2013.01); *H04B 7/0456* (2013.01); *H04L 1/0618* (2013.01); *H04L 5/0003* (2013.01)

(58) Field of Classification Search
     CPC . H04B 10/2581; H04B 7/0458; H04L 1/0618; H04L 5/0003
     (Continued)

(56) References Cited

U.S. PATENT DOCUMENTS 9,503,169 B1 * 11/2016 Lee .................. H04L 1/0618
2004/0147180 A1    7/2004 Gorshkov
(Continued)

FOREIGN PATENT DOCUMENTS

FR      3025676 A1      3/2016

OTHER PUBLICATIONS

European Search Report for 16305565.0 dated Nov. 30, 2016.
(Continued)

*Primary Examiner* — Don N Vo
(74) *Attorney, Agent, or Firm* — Meagher Emanuel Laks Goldberg & Liao, LLP

(57) ABSTRACT

Embodiments of the invention provide a Space-Time coding device for encoding a digital data sequence according to a predefined space-time coding rate, said data sequence comprising a set of modulated symbols to be transmitted over at least two propagation modes, during a number of time slots, through an optical transmission channel in a single-core multimode optical fiber transmission system, wherein the device comprises:

a codebook generator (53) configured to determine a set of codeword matrices defining a space-time code represented by a space dimension and a temporal dimension, each codeword matrix comprising complex values and a number of columns equal to said code temporal dimension, and a number of rows equal to said code space dimension, the codebook generator (53) being further configured to associate a difference codeword matrix and a distance metric to each pair of codeword matrices among said set of codeword matrices, each component of a difference codeword matrix associated with a given pair of codeword matrices being equal to the difference between the corresponding components of the codeword matrices of said pair, the distance
(Continued)

metric associated with a given pair of codeword matrices being determined by computing the Euclidean norm of the difference codeword matrix associated with said pair, wherein the codebook generator (53) is configured to select the components of the codeword matrices depending on the number of pairs of codeword matrices that are associated with a unitary difference codeword matrix and with a distance metric equal to a given Euclidean distance; and an encoding unit (55) configured to encode said set of modulated symbols into a codeword matrix selected from said set of codeword matrices.

16 Claims, 5 Drawing Sheets

(51) Int. Cl.
*H04B 7/0456* (2017.01)
*H04L 5/00* (2006.01)
*H04L 1/06* (2006.01)

(58) Field of Classification Search
USPC .................................. 398/140; 375/267, 299
See application file for complete search history.

(56) References Cited

U.S. PATENT DOCUMENTS

| | | | | |
|---|---|---|---|---|
| 2009/0196379 | A1* | 8/2009 | Gan | H04L 1/0054 375/340 |
| 2010/0278278 | A1* | 11/2010 | Lee | H04B 7/0628 375/267 |
| 2013/0329838 | A1* | 12/2013 | El-Hajjar | H04L 25/067 375/341 |
| 2014/0314410 | A1 | 10/2014 | Mumtaz et al. | |

OTHER PUBLICATIONS

Awwad E; Othman G R-B; Jaouen Y; Frignac Y: "Space-Time codes for mode-multiplexed optical fiber transmission systems", Optics InfoBase Conference Papers—Advanced Photonics for Communications—Signal Processing in Photonic Communications, SPPCom 2014, Jul. 17, 2017 (Jul. 17, 2014), San Diego, Retrieved from the Internet: URL: http://www.osapublishing.org/abstract.cfm?uri=SPPCom-2014-SM2D.4.

P. J. Winzer, High-Spectral-Efficiency Optical Modulation Formats, In Journal of Lightwave Technology, vol. 30, No. 24, pp. 3824-3835, Dec. 2012.

E. Awwad, Y. Jaouen, G. Rekaya-Ben Othman, E. Pincemin, Polarization-Time Coded OFDM for PDL mitigation in long-haul optical transmission systems, European Conference and Exhibition on Optical Communication (ECOC), P.3.4, London—UK, Sep. 2013.

A. Lobato, F. Ferreira, J. Rabe, M.Kuschnerov, B.Spinnler, B.Lankl, Mode Scramblers and Reduced-Search Maximum-Likelihood Detection for Mode-Dependent-Loss-Impaired Transmission, In the Proceedings of the European Conference and Exhibition on Optical Communication, Sep. 2013.

E. Awwad, G. Rekaya-Ben Othman, Y. Jaouën, and Y.Frignac, Space-Time Codes for Mode-Multiplexed Optical Fiber Transmission Systems, OSA Advanced Photonics Congress: Signal Processing for Photonic Communications (SPPCom), San Diego—USA, Jul. 2014.

* cited by examiner

SPACE-TIME CODING METHODS AND DEVICES FOR OPTICAL MIMO SYSTEMS

TECHNICAL FIELD

The invention generally relates to optical communications, and in particular to space-time coding methods and devices for optical fiber-based transmission systems using multi-mode fibers.

BACKGROUND

Optical transmission systems are used to transmit data in different types of systems such as telecommunication systems. Optical communication systems provide larger transmission capacities than wired or wireless communication systems. From access networks to metropolitan and long-haul networks, optical transmission technologies can carry data over long distances with low attenuations. They have become a key technology of modern telecommunication infrastructures.

During the last decade, the continuous growth in the number of connected machines and users as well as the emergence of multimedia applications and services have accelerated the demand for higher transmission data rates and hence the development of optical transmission systems which use optical fibers as optical transmission lines.

Such developments have been driven by the multiple degrees of freedom offered by the optical fibers. Optical fibers enable multiplexing more data channels and the introduction of new digital signal processing techniques that mitigate the impairments of the channel while guaranteeing a reliable communication with the highest achievable rates.

Several degrees of freedom are used in existing optical transmission systems such as amplitude, phase and polarization states of the optical field, time and wavelength.

Early optical communication systems were based on single-mode fibers. Optical-fiber transmission systems were based on an "On-Off" modulation of the intensity of light along with non-coherent detection. Such approach requires a low amount of optical components at low costs. However, it only takes advantage of the amplitude of the optical field.

To further exploit the phase of the optical field, coherent detection was introduced. Coherent detection enables the detection of both the amplitude and the phase of signals, thereby enabling the use of higher-order modulation formats and an increase of the capacity of optical fiber links.

In addition to coherent detection, optical amplifiers were also proposed to enable the transmission of independent modulated wavelength without opto-electrical regeneration as disclosed in "P. J. Winzer, High-Spectral-Efficiency Optical Modulation Formats, In Journal of Lightwave Technology, vol. 30, no. 24, pp. 3824-3835, December 2012". Such technique is known as Wavelength Division Multiplexing (WDM).

Coherent detection can double the capacity of an optical link by using the two orthogonal polarization states of the optical field. Using Polarization Division Multiplexing (PDM) techniques, independent data symbols can be sent over the two polarization states of the optical signal. As a result, the spectral efficiency of the optical transmission system can be also doubled.

On top of the various degrees of freedom offered by single-mode fibers, multi-mode fibers give access to an extra degree of freedom, so-called 'space' which stems from the availability of several propagation modes. A propagation mode defines the distribution of a wave while propagating in the fiber. Multi-mode fibers allow the propagation of many modes in a single-core or multi-core fibers where each core can be single-mode or multi-mode. The various propagation modes form a set of orthogonal channels over which independent data symbols can be multiplexed using Space Division Multiplexing (SDM) techniques. SDM in multi-mode fibers can enable a multiplication of the capacity of a link by the number of propagation modes.

Space remains the only available degree of freedom that can be used in optical transmission to meet the demand for more network capacity, since all the other degrees of freedom (namely frequency, time, phase, and polarization) are already exploited to satisfy the demand for bandwidth. There is accordingly a need to develop optical fiber transmission systems combining WDM, PDM, and SDM techniques that provide a support of higher capacities for example for access networks, metropolitan networks and long-haul terrestrial and transoceanic links, taking into account all available degrees of freedom of multi-mode fibers.

The multiplexing of independent data symbols over the various available degrees of freedom requires managing numerous impairments and crosstalk between the various multiplexing channels. Such impairments can deteriorate the performance of the transmission system. In both PDM and SDM systems, loss disparities between the channels are essentially due to imperfections of the optical components (e.g. fibers, amplifiers and multiplexers) and to crosstalk effects between the propagation modes in multi-mode fibers. Such imperfections induce non-unitary impairments, i.e. impairments that cause a loss of orthogonality and/or a loss of energy between the different channels over which independent data symbols are multiplexed. Such impairments can significantly reduce the capacity of the optical links.

Non-unitary effects in PDM systems, known as polarization dependent loss (PDL), have been addressed in "E. Awwad, Y. Jaouën, G. Rekaya-Ben Othman, E. Pincemin, Polarization-Time Coded OFDM for PDL mitigation in long-haul optical transmission systems, European Conference and Exhibition on Optical Communication (ECOC), P.3.4, London—UK, September 2013". Signal processing solutions combining Orthogonal Frequency Division Multiplexing (OFDM) with Polarization-Time Coding that provide efficient mitigation of PDL effects in PDM systems have been proposed. The developed Polarization-Time coding techniques are based on Space-Time codes, initially constructed for multiplexing data in wireless communication systems using multiple antenna technologies. Solutions exist for performing multi-carrier modulation through the use of OFDM for a low-complexity implementation of the Polarization-Time codes.

Non-unitary effects in SDM systems known as mode dependent loss (MDL), have been studied from both the optical and signal processing perspectives. Optical solutions using mode scrambling or strong mode coupling were proposed to reduce the impact of MDL on the channel capacity. For example, a technique based on placing mode scramblers between the fiber spans is disclosed in "A. Lobato, F. Ferreira, J. Rabe, M. Kuschnerov, B. Spinnler, B. Lankl, Mode Scramblers and Reduced-Search Maximum-Likelihood Detection for Mode-Dependent-Loss-Impaired Transmission, In the Proceedings of the European Conference and Exhibition on Optical Communication, September 2013". This technique enables the reduction of the MDL effect. However, it fails to completely mitigate MDL and requires a high number of scramblers.

The use of existing Space-Time codes comprising the Silver code, the Golden code and the Alamouti code for PDL mitigation have paved the way for investigating their possible potential for MDL mitigation in SDM systems. Digital signal processing solutions based on Space-Time coding for MDL mitigation in SDM systems were explored in recent works disclosed in "E. Awwad, G. Rekaya-Ben Othman, Y. Jaouën, and Y. Frignac, Space-Time Codes for Mode-Multiplexed Optical Fiber Transmission Systems, OSA Advanced Photonics Congress: Signal Processing for Photonic Communications (SPPCom), San Diego—USA, July 2014". Such approach was focused on SDM systems involving 3 and 6 propagation modes for different values of modal dispersion loss and revealed the promising potential of the use of Space-Time codes for a complete MDL mitigation at low costs.

The Space-Time codes used for MDL mitigation in existing approaches are codes that were essentially designed for wireless communication systems where signals carrying data symbols undergo Rayleigh fading-like attenuations. Although optical-fiber transmission systems can be represented as multiple-input multiple-output systems, the optical fiber propagation environment differs from the wireless medium. Existing Space-Time codes may not be accordingly sufficiently adapted to optical MIMO (for Multiple-Input Multiple-Output) systems, in particular to SDM systems. There is accordingly a need for digital coding techniques enabling a complete mitigation of MDL effects for SDM systems.

SUMMARY

In order to address and other problems, there is provided a Space-Time coding device for encoding a digital data sequence according to a predefined space-time coding rate. The data sequence comprises a set of modulated symbols to be transmitted over a number of propagation modes at least equal to two and during a number of time slots at least equal to two through an optical transmission channel in a single-core multi-mode optical fiber transmission system. The device comprises:

a codebook generator configured to determine a set of codeword matrices defining a space-time code represented by a space dimension and a temporal dimension. Each codeword matrix comprises complex values and a number of columns equal to the code temporal dimension and a number of rows equal to the code space dimension. The codebook generator may be configured to associate a difference codeword matrix and a distance metric to each pair of codeword matrices among the set of codeword matrices. Each component of a difference codeword matrix associated with a given pair of codeword matrices may be equal to the difference between the corresponding components of the codeword matrices of the pair. The distance metric associated with a given pair of codeword matrices may be determined by computing the Euclidean norm of the difference codeword matrix associated with the given pair. The codebook generator may be configured to select the components of the codeword matrices depending on the number of pairs of codeword matrices that are associated with a unitary difference codeword matrix and with a distance metric equal to a given Euclidean distance; and
  en encoding unit configured to encode the set of modulated symbols into a codeword matrix selected from the determined set of codeword matrices.

According to one aspect of the invention, the Space-Time coding device may further comprise a processing unit configured to determine a set of code parameters. The code parameters may be chosen in a group consisting of the code temporal dimension, the code space dimension, the number of codeword matrices in the set of codeword matrices, and a given Euclidean distance.

According to some embodiments, the processing unit may be configured to determine the code temporal dimension depending on the number of time slots and/or on the predefined space-time coding rate and/or on the number of the modulated symbols.

According to some embodiments, the Space-Time coding device may be configured to previously select a set of propagation modes from the number of propagation modes in the multi-mode fiber according to a mode selection criterion. In such embodiments, the processing unit may be configured to determine the code space-dimension depending on the selected set of propagation modes.

According to some embodiments, the codebook generator may be configured to select the components of the codeword matrices by maximizing the number of pairs of codeword matrices that are associated with a unitary difference codeword matrix and a distance metric equal to the given Euclidean distance with respect to the total number of possible pairs of codeword matrices.

According to some embodiments, the optical fiber transmission system may be associated with a predefined value of the transmission power and/or a predefined value of the mode-dependent loss.

According to some embodiments, the modulated symbols may be selected in a set of values depending on a modulation scheme.

According to some embodiments, the processing unit may be configured to determine the number of codeword matrices depending on the predefined value of the transmission power and/or on the modulation scheme associated with the modulated symbols and/or on the predefined space-time coding rate.

Further, according to some embodiments, the processing unit may be configured to determine the given Euclidean distance depending on the predefined value of the mode-dependent loss.

There is also provided an optical transmitter device capable of transmitting a data sequence in an optical communication system. The optical device may comprise a Space-Time coding device according to any preceding feature for encoding the data sequence.

There is also provided a receiver device capable of receiving and decoding a data sequence transmitted by an optical transmitter device.

According to some embodiments, the receiver device may comprise a decoder configured to decode the data sequence over the number of propagation modes.

According to other embodiments in which a selection of modes is performed at the transmitter device, the receiver device may comprise a decoder configured to decode the data sequence over a set of selected propagation modes lower than or equal to the number of propagation modes in the multi-mode fiber.

According to some embodiments, the decoder may be chosen in a group consisting of a maximum likelihood decoder, a Zero-Forcing decoder, a Zero-Forcing Decision Feedback Equalizer, and a Minimum Mean Square Error decoder.

The invention also provides a method of encoding a digital data sequence according to a predefined space-time coding rate. The data sequence comprises a set of modulated symbols to be transmitted over at least two propagation modes, during a number of time slots, through an optical transmission channel in a single-core multi-mode optical fiber transmission system. The method comprises:

determining a set of codeword matrices defining a space-time code represented by a space dimension and a temporal dimension. Each codeword matrix comprises complex values, a number of columns equal to the code temporal dimension, and a number of rows equal to the code space dimension. The method further comprises associating a difference codeword matrix and a distance metric to each pair of codeword matrices among the set of codeword matrices. Each component of a difference codeword matrix associated with a given pair of codeword matrices may be equal to the difference between the corresponding components of the codeword matrices of the given pair. The distance metric associated with a given pair of codeword matrices may be determined by computing the Euclidean norm of the difference codeword matrix associated with the pair of codeword matrices. The step of determining a set of codeword matrices may comprise selecting the components of the codeword matrices depending on the number of pairs of codeword matrices that are associated with a unitary difference codeword matrix and with a distance metric equal to a given Euclidean distance.

The method further comprises encoding the set of modulated symbols into a codeword matrix selected from the determined set of codeword matrices.

There is also provided a computer program product for encoding a digital data sequence according to a predefined space-time coding rate. The data sequence comprises a set of modulated symbols to be transmitted over at least two propagation modes, during a number of time slots, through an optical transmission channel in a single-core multi-mode optical fiber transmission system. The computer program product comprising:

a non-transitory computer readable storage medium, and
instructions stored on the non-transitory computer readable storage medium that, when executed by a processor, cause the processor to:
determine a set of codeword matrices defining a space-time code represented by a space dimension and a temporal dimension. Each codeword matrix comprises complex values and a number of columns equal to the code temporal dimension and a number of rows equal to the code space dimension. The computer program product being caused to associate a difference codeword matrix and a distance metric to each pair of codeword matrices among the set of codeword matrices. Each component of a difference codeword matrix associated with a given pair of codeword matrices being equal to the difference between the corresponding components of the codeword matrices of the pair. The distance metric associated with a given pair of codeword matrices being determined by computing the Euclidean norm of the difference codeword matrix associated with the given pair. The processor being further caused to select the components of the codeword matrices depending on the number of pairs of codeword matrices that are associated with a unitary difference codeword matrix and with a distance metric equal to a given Euclidean distance.

The processor being caused to encode the set of modulated symbols into a codeword matrix selected from the determined set of codeword matrices.

Advantageously, the various embodiments provide low-complexity solutions for mitigating mode-depend loss effects in optical transmission systems.

Advantageously, some embodiments of the invention provide Space-Time coding solutions adapted to a predefined value of mode-dependent loss in a multi-mode optical-fiber transmission system.

Advantageously, in combination with the selection of a set of propagation modes over which independent data symbols are transmitted and/or received, the various embodiments provide a Space-Time coding solution adapted to the number of selected modes, enabling a complexity reduction in particular in multi-mode fibers and an optimization of the use of the available transmission power.

Further advantages of the present invention will become clear to the skilled person upon examination of the drawings and the detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, illustrate some embodiments of the invention.

DESCRIPTION

Embodiments of the present invention provide, alone or in combination, devices, methods and computer program products for encoding a digital data sequence according to a predefined space-time coding rate. The data sequence comprises a set of modulated symbols to be transmitted through an optical transmission channel in a single-core multi-mode optical fiber transmission system. Embodiments of the present invention provide Space-Time coding devices, methods and computer program products based on the construction of a set of codewords for encoding the digital data sequence according to a construction criterion enabling a complete mitigation of the mode-depend loss effects resulting from the crosstalk between various channels made available by the propagation modes in the multi-mode optical fiber.

Devices, methods and computer program products according to the various embodiments of the invention may be implemented in optical fiber transmission systems applied to a wide variety of applications. Exemplary applications comprise, without limitation, telecommunications, aerospace and avionics, data storage, automotive industry, biomedical industry, and transportation.

Telecommunication applications are widespread, ranging from desktop computers or terminals to nationwide networks. Such applications may involve the transmission of voice, data, or video over distances of less than a meter to hundreds of kilometers (e.g. transmission of voice, data, images or video) or connection of networks (e.g. connection for switches or routers in local area networks).

In the aerospace and avionics industries, optical fiber-based products may be used in military and/or commercial applications. Optical fiber technologies and products are designed in such applications to meet rigorous testing and certifications requirements in harsh environments and conditions.

In data storage applications, optical fibers may be used in data storage equipment as a link between multiple devices in a network and/or as part of a storage system. Optical fiber connectivity offers very high bandwidth even over extended distances.

In automotive industry applications, optical fiber technologies may be used for example in lighting, communications, and sensing for safety and control devices and systems.

In biomedical industry applications, optical-fiber transmission systems are used in most modern telemedicine devices for transmission of digital diagnostic images.

In transportation systems, smart highways with intelligent traffic lights, automated tollbooths and changeable message signs use telemetry systems based on optical fibers.

The following description of certain embodiments will be made with reference to telecommunication systems, for illustration purpose only. However, the skilled person will readily understand that the various embodiments of the invention may be integrated in other types of systems for different applications.

Figure 1:
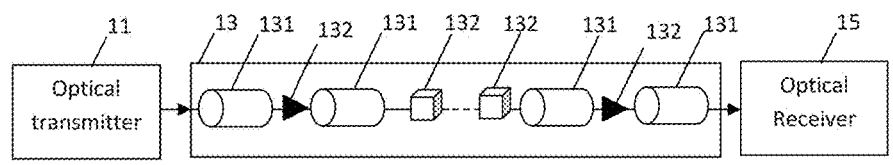
FIG. 1 illustrates a schematic diagram of an exemplary application of the invention in optical communication systems.

FIG. 1 illustrates an exemplary application of the invention in a communication system 100 based on optical fiber transmission. The communication system 100 comprises at least one optical transmitter device 11 (hereinafter referred to as a "transmitter") configured to encode an input data sequence into an optical signal and transmit it to at least one optical receiver device 15 (hereinafter referred to as a "receiver") through an optical fiber transmission channel 13.

The optical fiber transmission channel 13 may comprise one or more fiber spans 131. The optical fiber is a cylindrical non-linear waveguide consisting of one or more cores, a cladding and a coating. The optical signal sent by the optical transmitter 11 is confined in the core(s) through total internal reflections due to the difference between the refractive indices of the core and the cladding.

The optical fiber transmission channel 13 may also comprise one or more amplifiers 132 inserted periodically between each pair of fiber spans along the optical fiber link to compensate the fiber attenuation and carry the signal over long distances without the need to regenerate the optical signal. Exemplary optical amplifiers comprise Erbium doped fiber amplifiers (EDFA). Such amplifiers may be implemented in long-haul optical transmissions. They may be inserted every 40 to 120 kilometers to enhance the signal power according to the type of the fiber, the length of the optical link and the application.

In some embodiments using multi-mode fibers, the amplifiers 132 may be configured to simultaneously amplify the optical signal corresponding to a plurality of propagation modes. Exemplary amplifiers in such embodiments comprise Few Mode Amplifiers such as Few Mode Erbium Doped Fiber Amplifiers.

In some embodiments, the optical signal amplification may be performed in a distributed manner using the non-linear simulated Raman scattering effect. In such embodiments, the fiber may be used as both a transmission link and an amplification medium.

In other embodiments, signal amplification may be achieved by combining a periodic insertion of optical amplifiers such as the EDFA with the use of simulated Raman Scattering effects.

In still other embodiments, the signal amplification may be performed in the electrical domain through an optical/electrical conversion (not shown in FIG. 1). In such embodiments, the optical fiber transmission channel 13 may comprise, at each amplification stage:
  a photodiode for converting the optical signal back to the electrical domain;
  an electrical amplifier for amplifying the converted electrical signal; and
  a laser diode for generating an optical signal corresponding to the amplified electrical signal.

The propagation of the optical signal along the optical fiber spans 131 is defined by the number of propagation modes that may depend on several parameters such as the radius of the fiber core, the wavelength of the optical carrier and the difference between the refraction index of the core and the cladding.

In some embodiments, space division multiplexing techniques may be implemented at the optical fiber transmission system 13 using for example multi-mode comprising a number $N \geq 2$ of propagation modes. Large core fibers are examples of multi-mode fibers comprising a large number of propagation modes. Few-mode fibers comprise a number of propagation modes comprised between two (2) and ten (10). Each propagation mode may be characterized by a different velocity.

In some embodiments using space division multiplexing in multi-mode fibers, the different propagation modes may overlap in a form of an energy transfer between the modes. As a result, the various data symbols carried by each mode may couple along the fiber inducing a crosstalk and an inter-symbol interference. In such embodiments, the optical fiber transmission channel 13 may further comprise a plurality of scrambling components 132 (hereinafter referred to as "scramblers"). The scramblers 132 may be periodically inserted in the channel with a given scrambling period for reducing the crosstalk effect and averaging the losses experienced by the different propagation modes.

According to some embodiments, a scrambler 132 may be associated with each optical amplifier.

Figure 2:
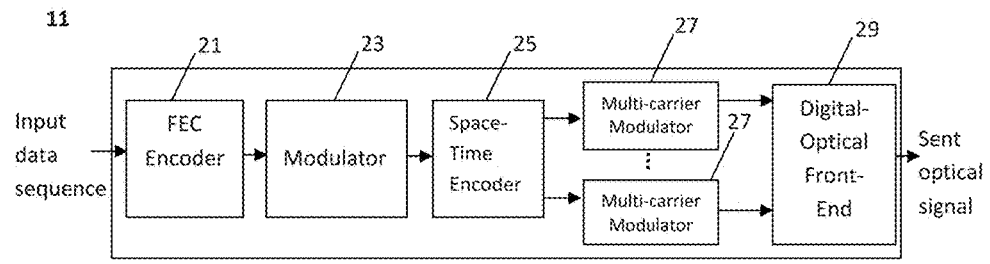
FIG. 2 illustrates a block diagram illustrating the structure of an optical transmitter according to some embodiments of the invention.

FIG. 2 illustrates a detailed structure of an optical transmitter 11 according to certain embodiments. The optical transmitter 11 may be configured to transform an input data sequence into an optical signal to be transmitted through the optical transmission channel 13. The optical transmitter 11 may comprise:

- a FEC encoder 21 configured to encode the input data sequence using a Forward Error Correction code (FEC) such as a linear block code or a convolutional code;
- a modulator 23 configured to modulated the encoded input data sequence using a modulation scheme such as Quadrature Amplitude Modulation (QAM) and deliver a modulated data sequence;
- a Space-Time Encoder 25 configured to generate a codeword matrix carrying the data symbols to be sent through the optical transmission channel 13 during a Time Transmission Interval (TTI). The Space-Time encoder 25 may be configured to transform each received sequence of Q modulated symbols $s_1$, $s_2, \ldots, s_Q$ into a codeword matrix X of dimension $N_t \times T$. A codeword matrix comprises complex values arranged in $N_t$ rows and T columns where $N_t$ designates the number of used propagation modes and T designates the temporal length of the coding scheme and corresponds to the number of channel uses. Each value of a codeword matrix corresponds accordingly to a time of use and to a propagation mode.
- a plurality of multi-carrier modulators 27 configured to generate a multi-carrier symbol by implementing a multi-carrier modulation technique within each optical carrier involving a large number of orthogonal sub-carriers. Further, multi-carrier modulations may be implemented in the presence of multi-mode fibers to decouple the different modes and provide a better resistance to the inter-symbol interference resulting from the fiber dispersion and crosstalk between the various modes. Exemplary multi-carrier modulation formats comprise Orthogonal Frequency Division Multiplexing (OFDM) and Filter Bank Multi-Carrier (FBMC).
- a digital-optical Front-End 29 configured to convert the modulated frequency-domain signal delivered by the multicarrier modulator to the optical domain using a number of lasers of given wavelengths and a plurality optical modulators (not shown in FIG. 2) associated with the used polarization states and the different propagation modes. A laser may be configured to generate a laser beam of a same or different wavelength. The different laser beams may be then modulated using the different outputs of the OFDM symbols (or the different values of the codeword matrix in embodiments using single-carrier modulations) by means of the optical modulators and polarized according to the different polarization states of the fiber. Exemplary modulators comprise Mach-Zehnder modulators. A phase and/or amplitude modulation may be used. In addition, the modulation scheme used by the various optical modulators for modulating the different optical signals may be similar or different.

The number of the optical modulators and lasers depends on the number of used polarization states, the number of used propagation modes, and in general on the number of cores in the fiber. The optical signal thus generated may be then injected in the optical fiber to propagate therein according to the different propagation modes.

According to some embodiments, the optical transmitter 11 may be configured to transmit the optical signal using all available propagation modes. In such embodiments, the number of used propagation modes $N_t$ may be equal to all the propagation modes N, $N_t = N$.

Alternatively, in some embodiments, the optical transmitter 11 may be configured to transmit the optical signal using a set of propagation modes previously selected among the available propagation modes according to a mode selection criterion. The number of used propagation modes $N_t$ may be in this case strictly lower than the number of available modes, $N_t < N$. In such embodiments, the optical receiver 15 may be configured to process either the used propagation modes by the optical transmitter 11 or process the totality of the available propagation modes.

Figure 3:
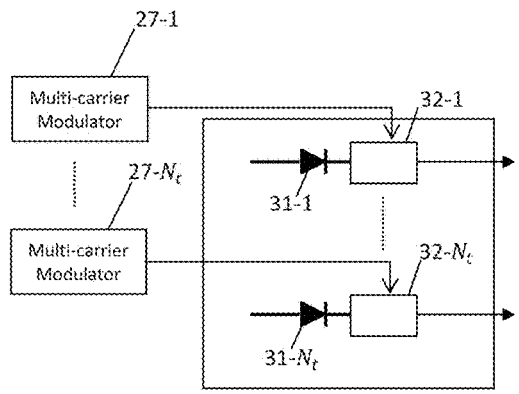
FIG. 3 illustrates a schematic diagram of a digital-optical front-end according to some embodiments using single polarization.

FIG. 3 is a block diagram of the Digital-Optical Front-End 29 according to some embodiments in which a single-core multi-mode fiber and a single polarization state are used. In such embodiments, the number of used propagation modes is lower than or equal to the number N of available propagation modes $N_t \leq N$. The Digital-Optical Front-End 29 may accordingly comprise:

- $N_t$ lasers 31-$n$ for n=1, ..., $N_t$ of a same wavelength $\lambda_n$, each laser being configured to generate a laser beam;
- N optical modulators 32-$n$ for n=1, ..., $N_t$ associated with the $N_t$ used propagation modes. Each modulator 32-$n$ may be configured to modulate a laser beam for a time of channel use using a component of the multi-carrier symbol or the codeword matrix in single-carrier embodiments. The modulated beams may be then injected into the multi-mode fiber to propagate each according to a separate mode.

In another embodiment in which wavelength division multiplexing is used, each laser 31-$n$ may use a plurality of wavelengths. The wavelengths may be similar or different. In such embodiment, the plurality $N_t$ of used modes may be combined with a plurality of W wavelengths, each mode being associated with W wavelengths. Accordingly, the Digital Optical Front-End 29 may comprise W lasers of different wavelengths, the beam generated by each laser being modulated by $N_t$ optical modulators (not show in FIG. 3).

In still other embodiments in which polarization division multiplexing is used, the optical signal may be transmitted over the two polarization states of the optical field. In such embodiments (not shown in the figures), the Digital Optical Front-End 29 may comprise $N_t$ lasers, $N_t$ polarization splitters configured to provide two orthogonal polarizations and $2N_t$ optical modulators. Each pair of modulators may be associated with a laser and may be configured to modulate the signals which are polarized orthogonally. Exemplary polarization splitters comprise for example Wollaston prisms and polarization splitting fiber couplers. In addition, the optical fiber transmission link 13 may further comprise polarization scramblers (not depicted in FIG. 1) configured to compensate the polarization dependent losses.

The optical signal generated according to any of the preceding embodiments may propagate along the fiber until it reaches the other end of the optical transmission system 13 where it is processed by an optical receiver 15.

Figure 4:
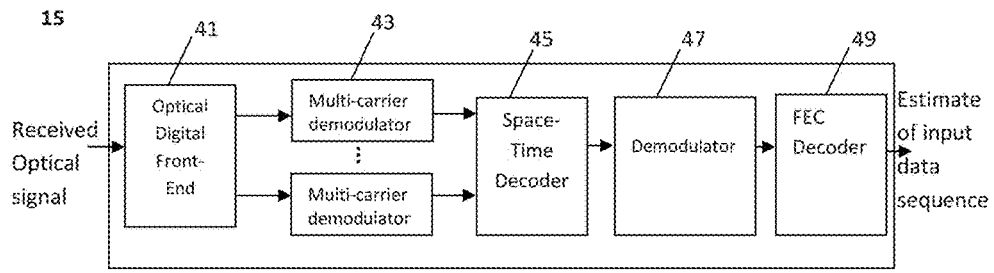
FIG. 4 is a block diagram illustrating the structure of an optical receiver according to some embodiments of the invention.

FIG. 4 is a block diagram of an optical receiver 15 according to some embodiments. The optical receiver 15 may be configured to receive and process the transmitted optical signal by the optical transmitter 11 for generating an estimate of the original input data sequence. The optical receiver 15 may comprise:

- an optical-digital front-end 41 configured to detect the optical signal, using for example one or more photodiodes, and to convert it into a digital signal;

a plurality of multi-carrier demodulators configured to remove the cyclic prefix and generate a set of decision variables to be delivered to the Space-Time decoder 45;

a Space-Time decoder 45 configured to generate an estimate of the modulated data sequence from the set of decision variables by applying a decoding algorithm;

a demodulator 47 configured to generate a binary sequence by performing a demodulation of the modulated data sequence estimated by the Space-Time decoder 4; and a FEC decoder 49 configured to deliver an estimate of the input data sequence processed by the optical transmitter device 11, using for example the Viterbi algorithm.

According to some embodiments, the Space-Time decoder 45 may implement a decoding algorithm chosen in a group consisting of a maximum likelihood decoder, a Zero-Forcing decoder, a Zero-Forcing Decision Feedback Equalizer, and a Minimum Mean Square Error decoder.

Exemplary maximum likelihood decoders comprise the sphere decoder, the Schnorr-Euchner decoder, the stack decoder, the spherical-bound-stack decoder.

In embodiments using single-carrier modulations, the plurality of multi-carrier modulators 27 may be replaced by a single modulator. Similarly, the multi-carrier demodulators 43 may be replaced by a single demodulator.

The various embodiments of the present invention provide Space-Time encoding methods and devices for multi-mode fiber transmission systems enabling a total efficient mitigation against the mode-depend loss effects.

Figure 5:
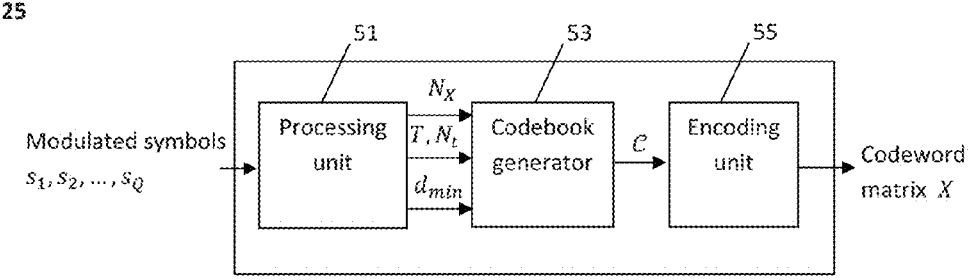
FIG. 5 is a block diagram representing the structure of a Space-Time encoding device according to some embodiments of the invention.

Referring to FIG. 5, there is shown a Space-Time encoder 25, according to some embodiments in which single-core multi-mode fibers are used.

The following description of some embodiments of the invention will be made with reference to space division multiplexing in single-core multi-mode fibers using a single polarization and a single wavelength, for illustration purpose only. However, the skilled person will readily understand that the following embodiments may be applied in combination with wavelength division multiplexing using several wavelengths and/or using a dual polarization of the optical signals according to the two polarization directions of the optical field.

Accordingly, the Space-Time encoder 25 may be configured to receive a sequence of Q modulated symbols $s_1, s_2, \ldots, s_Q$ and encode such sequence according to a predefined space-time coding rate r into a codeword matrix X that belongs to a codebook $\mathcal{C}$. The encoded sequence is then sent over a time transmission interval. The symbols belong to a finite set of values that depend on the used modulation format. Exemplary modulation schemes comprise $2^q$-QAM (Quadrature Amplitude Modulation) where each symbol $s_p$ comprises q bits and has a mean power denoted by $E_s$. Referring to FIG. 5, the Space-Time encoder 25 may comprise:

a processing unit 51 configured to determine a set of code parameters comprising the temporal length of the code denoted by T, the space dimension of the code representing the number $N_t$ of used propagation modes for spatially multiplexing the various modulated symbols, the number of codeword matrices denoted by $N_X$=card($\mathcal{C}$) (equivalently the cardinality of the codebook $\mathcal{C}$), and a value denoted by $d_{min}$ representing the minimum Euclidean distance of the code. The minimum Euclidean distance of the code represents the minimum Euclidean distance between two adjacent (different) codeword matrices in the codebook $\mathcal{C}$. By encoding Q symbols to be sent during T channel uses, the space-time coding rate is given by $$r = \frac{Q}{T}$$

symbols per channel use.

The Space-Time encoder 25 may further comprise a codebook generator 53 configured to generate $N_X$ codeword matrices each of dimension $N_t \times T$ defining a space-time code represented by a space dimension and a temporal dimension. A codeword matrix X comprises complex values arranged in $N_t$ rows and T columns where $N_t$ designates the space dimension of the code and corresponds to the number of used propagation modes. T designates the temporal dimension of the code and corresponds to the number of time channel uses. Accordingly, a codeword matrix X can be written in the form $$X = \begin{pmatrix} x_{11} & \ldots & x_{1T} \\ \vdots & \ldots & \vdots \\ x_{N_t 1} & \ldots & x_{N_t T} \end{pmatrix}.$$

Each value $x_{ij}$ of the codeword matrix X corresponds to the $i^{th}$ propagation mode, for $i=1, \ldots, N_t$, and the $j^{th}$ time of use, for $j=1, \ldots, T$. Each pair of different codeword matrices $X_l$ and $X_p$ for $l \neq p$, may be associated with a difference codeword matrix $A_{lp}$ determined by computing the difference between the different codeword matrices such that $A_{lp}=X_l-X_p$. Each component $a_{ij}^{(lp)}$ of the difference codeword matrix $A_{lp}$ is determined by computing the difference between the corresponding components of the codeword matrices $X_l$ and $X_p$. In addition, each difference codeword matrix may be associated with a distance metric equal to the Euclidean norm of the difference codeword matrix and given by:

$$d_{lp}=\|A_{lp}\|=\|X_l-X_p\| \tag{1}$$

For $N_X$ different codeword matrices, the total number of pairs of different codeword matrices is finite and is given by the combination of 2 over $N_X$, denoted by $N_{pairs}=C_{N_t}^2$.

The codebook generator 53 may be configured to determine the components $x_{ij}$ (for $i=1, \ldots, N_t$ and $j=1, \ldots, T$) of the codeword matrices in the set of the $N_X$ codeword matrices according to the number of the pairs of codeword matrices among the total number of pairs $N_{pairs}$ that are associated with a unitary difference codeword matrix and with a distance metric equal to a given Euclidean distance.

In some embodiments, the codebook generator 53 may be configured to determine the components $x_{ij}$ of the codeword matrices in the set of the $N_X$ codeword matrices by maximizing of the number of pairs of codeword matrices that are associated with a unitary difference codeword matrix and a distance metric equal to the minimum Euclidean distance $d_{min}=\min_{l \neq p} d_{lp}$ with respect to the total number $N_{pairs}$ of possible pairs of different codeword matrices.

The Space-Time encoder 25 may further comprise an encoding unit 55 configured to encode the sequence of modulated symbols $s_1, s_2, \ldots, s_Q$ into a codeword matrix X selected among the set of $N_X$ codeword matrices in the codebook $\mathcal{C}$.

The space-time coding rate corresponding to encoding Q complex-value modulated symbols to be transmitted over the T channel uses, is equal to $$r = \frac{Q}{T}$$

symbols/channel use. Accordingly, in some embodiments where the space-time coding rate r is predefined, the processing unit 51 may be configured to determine the temporal length of the code T depending on the Transmission Time Interval and/or the number of modulated symbols Q, and/or depending on the predefined space-time coding rate.

According to some embodiments, the space dimension of the code may correspond to all available modes in the multi-mode fiber.

Alternatively, in some embodiments using mode selection at the transmitter and/or at the receiver, the space dimension of the code may correspond to the number of the used propagation modes selected among all the available modes in the multi-mode fiber according to a mode selection criterion.

Transmission over optical fiber links is generally power-constrained depending on the power of the injected optical signal in the fiber. The processing unit 51 may be accordingly configured to determine the number of codeword matrices depending on the predefined value of the transmission power and/or on the used modulation scheme for generating the sequence of modulated symbols, and/or on the predefined space-time coding rate.

Further, in some embodiments where the value of the mode-depend loss that may be supported by the optical fiber transmission link is predefined, the processing unit 51 may be configured to determine the minimum Euclidean distance depending on a predefined value of the mode-depend loss. The value of the mode-dependent loss may depend for example on the number of the used scramblers and/or the length of the optical fiber link.

Figure 6:
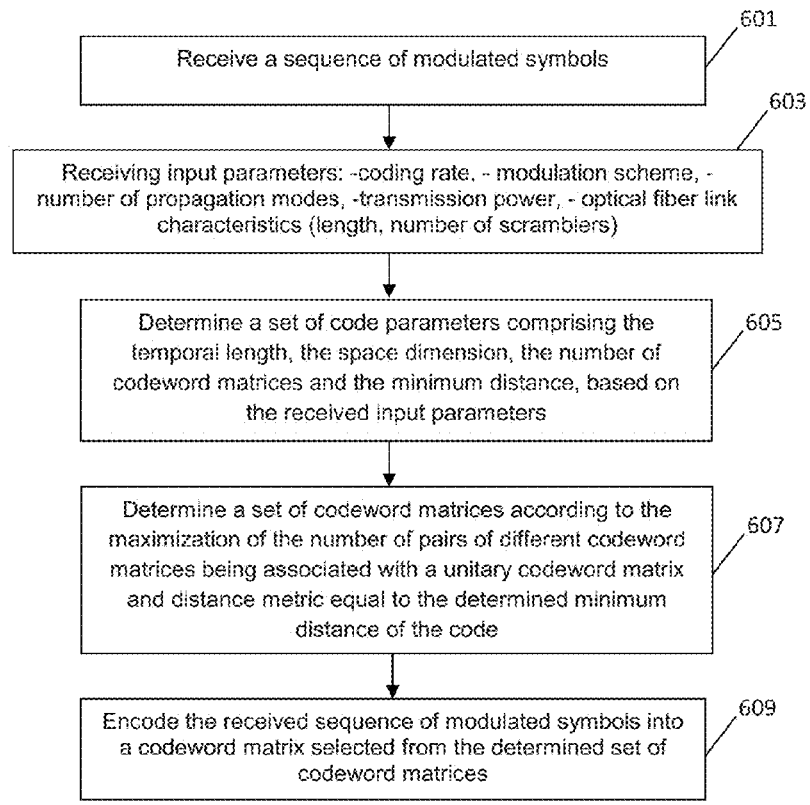
FIG. 6 is a flowchart illustrating a Space-Time encoding method according to some embodiments of the invention.

FIG. 6 is a flowchart depicting the Space-Time encoding method according to some embodiments in which the transmission system uses space division multiplexing in single-core fibers, single carrier modulation formats, single wavelength, and a single polarization.

In step 601, a sequence of Q modulated symbols $s_1, s_2, \ldots, s_Q$ may be received from the modulator 23. The symbols may take complex values selected in a set of values depending on the previously used modulation scheme by the modulator 23. Different modulation schemes may be implemented such as $2^q$-QAM or $2^q$-PSK with $2^q$ symbols or states. Each modulated symbol comprises q bits. In addition, a symbol $s_p$ has a mean power $E_s$, and can be written in the form:

$$s_p = Re(s_p) + i\, Im(s_p) \quad (2)$$

In equation (2), i denotes the complex number such that $i^2 = -1$ and the Re(.) and Im(.) operators output respectively the real and imaginary parts of an input value.

When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet $A=[-(q-1),(q-1)]$.

In step 603, a set of input parameters may be received or retrieved (for example from some storage means comprised in the optical transmitter device 11). The set of input parameters may comprise a predefined space-time coding rate denoted by r, the modulation scheme used to determine the modulated symbols, the number N of the available propagation modes in the multi-mode fiber, the transmission power associated with the optical transmission system 13, and the optical fiber link characteristics comprising at least the length of the optical link and/or the number of scramblers deployed in the optical fiber channel.

In step 605, a set of code parameters may be determined. The code parameters may comprise the temporal length of the code denoted by T, the space dimension of the code representing the number $N_t$ of the propagation modes to be used for spatially multiplexing the various modulated symbols, the number of codeword matrices denoted by $N_X$ and the minimum Euclidean distance of the code denoted by $d_{min}$. The code parameters may be determined such that the Q received symbols are sent through the optical transmission channel during T channel uses, according to the predefined space-time coding rate defined by $$r = \frac{Q}{T}$$

symbols per channel use.

According to some embodiments, the temporal length of the code may be determined depending on the Transmission Time Interval. The transmission Time Interval represents the total transmission time during which the optical transmitter is configured to transmit the optical signal to the optical receiver. The temporal length T may be further determined depending on the number of modulated symbols Q, and/or the predefined space-time coding rate r according to the relation $$r = \frac{Q}{T}.$$

In some embodiments, the space dimension $N_t$ of the code may be equal to the number N of all the available propagation modes in the multimode fiber.

Generally, the various propagation modes in a space division multiplexing system do not undergo the same losses due for example to imperfections of the waveguide and imperfections of the optical components inserted in the optical transmission link. Such imperfections result in different modal loss disparities. In such cases, a selection of modes may be performed at the transmitter and/or receiver according to a selection criterion such that only a selected set of modes is used to propagate the optical signal along the fiber. Several selection criteria have been disclosed in the patent application N° FR3025676. Exemplary criteria comprise the selection of a set of modes according to the maximization of the capacity of the space division multiplexing system and the optimization of the average received energy.

In embodiments applying a selection of modes, the space dimension of the code may be equal to the number of propagation modes selected among the available modes.

According to some embodiments, the number $N_X$ of codeword matrices representing the codebook C may be determined depending on the predefined value of the transmission power and/or on the used modulation scheme for generating the sequence of modulated symbols, and/or on the predefined space-time coding rate.

According to some embodiments, the minimum Euclidean distance of the code $d_{min}$ may be determined depending on a predefined value of the mode-dependent loss that can be supported by the optical fiber transmission link according to the predefined optical fiber link characteristics.

Given the determined set of code parameters, step 607 may be performed to construct a set of $N_X$ codeword matrices according to a construction criterion related to difference codeword matrices associated with each pair of different codewords. Each codeword matrix is of dimension $N_t \times T$. A codeword matrix X comprises complex values arranged in $N_t$ rows and T columns with $N_t$ designating the number of used propagation modes and T designating the temporal length of the code determined in step 605. Each value $x_{ij}$ of the codeword matrix X will propagate across the optical fiber link according to the $i^{th}$ propagation mode, for $i=1, \ldots, N_t$, and the $j^{th}$ time of use, for $j=1, \ldots, T$. Accordingly, the optical transmission system may be represented by an optical multiple-input multiple-output system described by the relation:

$$Y = H \cdot X + Z \qquad (3)$$

In equation (3):
- X designates a codeword matrix that belongs to the set of $N_X$ codeword matrices,
- Y is a complex-value matrix of dimension $N_t \times T$ designating the received signal,
- H is a complex-value matrix of dimension $N_t \times N_t$ designating the optical channel matrix and representing the undergone attenuations during the optical signal propagation over the different propagation modes, and
- Z is a complex-value matrix of dimension $N_t \times T$ designating the optical channel noise.

In some embodiments, the channel noise may be modeled by a White Gaussian variable of $2\sigma^2$ variance per complex dimension.

In some embodiments, the channel matrix may be given by:

$$H = \sqrt{\alpha} \sqrt{D} U \qquad (4)$$

In equation (4), D designates a diagonal matrix of diagonal components uniformly selected from the interval $[\lambda_{min}, \lambda_{max}]$ and represent the different losses experienced by the different propagation modes. U denotes a unitary matrix modeling the coupling between the different propagation modes and $\alpha$ characterizes the mode average propagation loss according to the expression:

$$\alpha = \frac{N_t}{\sum_{k=1}^{N_t} \lambda_k} \qquad (5)$$

The channel matrix accordingly satisfies $(HH^*) = N_t$, with Tr(A) designating the trace of a given matrix A and the operator $(.)^*$ designating the Hermitian conjugate operation.

The construction criterion related to the difference codeword matrices has been elaborated by the inventors from a decoding error optimization problem which assumes the use of maximum likelihood decoding at the optical receiver 13. A maximum likelihood decoder is configured to determine an estimate of the transmitted codeword matrix according to the minimization of the Euclidean distance.

In some embodiments assuming that the channel matrix is known at the optical receiver using for example one or more training sequences, the decoding error probability under maximum likelihood decoding may be expressed by:

$$P_e = \sum_{X_l \in C} Pr(X_l) Pr(X_p \neq X_l) \qquad (6)$$

In equation (6), $X_l$ (respectively $X_p$) designates the transmitted codeword (respectively the estimated codeword). In the presence of equipropable codewords, the error probability in equation (6) may be upper bounded by:

$$P_e \leq \sum_{X_l \in C} \frac{1}{\text{card}(C)} \sum_{X_p \neq X_l} Pr(X_l \rightarrow X_p) \qquad (7)$$

In equation (7), $Pr(X_l \rightarrow X_p)$ denotes the pairwise error probability corresponding to the error probability that for a transmitted codeword $X_l$, a different codeword matrix $X_p$ is estimated. The pairwise error probability is expressed by:

$$Pr(X_l \rightarrow X_p) = Q\left(\frac{\|H(X_l - X_p)\|}{2\sigma}\right) \qquad (8)$$

In equation (8), Q(.) designates the Q function (not to be confused with the number of modulated symbols) defined by:

$$Q(u) = \frac{1}{2\pi} \int_u^{+\infty} e^{-t^2} dt \qquad (9)$$

Using the Chernoffs bound and by averaging over the channel realizations, the pairwise error probability may be upper bounded according to:

$$Pr(X_l \rightarrow X_p) \leq E_H\left[\exp\left(-\frac{\|H(X_l - X_p)\|^2}{8\sigma^2}\right)\right] \qquad (10)$$

Each pair of different codeword matrices $X_l$ and $X_p$ for $l \neq p$, may be associated with a difference codeword matrix $A_{lp}$ determined by computing the difference between the different codeword matrices such that $A_{lp} = X_l - X_p$. In addition, each difference codeword matrix may be associated with a distance metric given by $d_{lp} = \|A_{lp}\| = \|X_l - X_p\|$. In particular, the minimum Euclidean distance of the codebook C corresponds to the minimum distance metric over all the pairs of different codeword matrices.

For $N_X$ different codeword matrices, the total number of pairs of different codeword matrices is finite and is given by the combination of 2 over $N_X$, denoted by $N_{pairs} = C_{N_t}^2$.

Using the difference codeword matrix notation, equation (10) may be equivalently written as:

$$Pr(X_l \rightarrow X_p) \leq E_H\left[\exp\left(-\frac{\|\sqrt{\alpha}\sqrt{D}UA_{lp}\|^2}{8\sigma^2}\right)\right] \qquad (11)$$

By combining equations (5) and (11), the upper bound of the decoding error probability in equation (7) may be expressed as:

$$P_e \leq \qquad (12)$$

$$\sum_{X_l \in C} \frac{1}{\text{card}(C)} \sum_{X_p \neq X_l} E_H\left[\exp\left(-\frac{N_t}{\sum_{k=1}^{N_t} \lambda_k} \frac{Tr(DUA_{lp}A_{lp}^* U^*)}{8\sigma^2}\right)\right]$$

The upper bound expression in equation (12) may be divided into two terms $T_1$ and $T_2$ such that:

$$T_1 = \sum_{X_l \in C} \frac{1}{\text{card}(C)} \sum_{\substack{X_p \neq X_l \\ A_{lp} \text{ unitary}}} E_H\left[\exp\left(-\frac{N_t}{\sum_{k=1}^{N_t} \lambda_k} \frac{Tr(DUA_{lp}A^*_{lp}U^*)}{8\sigma^2}\right)\right] \quad (13)$$

And:

$$T_2 = \sum_{X_l \in C} \frac{1}{\text{card}(C)} \sum_{\substack{X_p \neq X_l \\ A_{lp} \text{ non-unitary}}} E_H\left[\exp\left(-\frac{N_t}{\sum_{k=1}^{N_t} \lambda_k} \frac{Tr(DUA_{lp}A^*_{lp}U^*)}{8\sigma^2}\right)\right] \quad (14)$$

The first term $T_1$ comprises the pairs of difference codeword matrices associated with unitary difference codeword matrices, while the second term $T_2$ comprises the pairs of difference codeword matrices associated with non-unitary difference codeword matrices.

Using the properties of unitary matrices and the minimum Euclidean distance of the code, the first term may be upper bounded according to the expression:

$$T_1 \leq \left(\frac{1}{\text{card}(C)} \sum_{X_l \in C} N_{1min,l}\right) \exp\left(-\frac{d_{min}^2}{8\sigma^2}\right) \quad (15)$$

In equation (15), $N_{1min,l}$ designates the number of the codeword matrices in the codebook C having a distance metric to the transmitted codeword matrix $X_l$ equal to $d_{min}$ and being associated with a unitary difference codeword matrix. By averaging over all the codeword matrices $X_l$, equation (15) may be simplified as:

$$T_1 \leq \overline{N}_{1min} \exp\left(-\frac{d_{min}^2}{8\sigma^2}\right) \quad (16)$$

In equation (16), $\overline{N}_{1min}$ designates the average number of neighbor codeword matrices associated with a unitary difference codeword matrix and a distance metric equal to the minimum Euclidean distance $d_{min}$ of the code.

The second term $T_2$ may be simplified as follows. First, using the property that $\sum_{k=1}^{N} \lambda_k \leq N\lambda_{max}$, the pairwise error probability involved in equation (14) may be upper bounded according to:

$$Pr(X_l \rightarrow X_p) \leq E_{D,U}\left[\exp\left(-\frac{Tr(DUA_{lp}A^*_{lp}U^*)}{8\sigma^2 \lambda_{max}}\right)\right] \quad (17)$$

In equation (17), the upper bound on the pairwise error probability is computed by averaging over the diagonal entries of the matrix D and the components of the unitary matrix U.

Using the property that the product matrix $A_{lp}A^*_{lp}$ is a square Hermitian matrix, there exists a unitary matrix V and a diagonal matrix $\Sigma = \text{diag}(\Sigma_1, \Sigma_2, \ldots, \Sigma_{N_t})$ such that $A_{lp}A^*_{lp} = V\Sigma V^*$. Equation (17) may be accordingly written as:

$$Pr(X_l \rightarrow X_p) \leq E_{D,U}\left[\exp\left(-\frac{Tr(DUV\Sigma V^* U^*)}{8\sigma^2 \lambda_{max}}\right)\right] \quad (18)$$

Given that the matrix U is randomly drawn from the unitary matrices ensemble, the product matrix UV follows the same distribution as the matrix U. Then, equation (18) can be equivalently expressed as:

$$Pr(X_l \rightarrow X_p) \leq E_{D,U}\left[\exp\left(-\frac{Tr(DU\Sigma U^*)}{8\sigma^2 \lambda_{max}}\right)\right] \quad (19)$$

By developing the product matrix $DU\Sigma U^*$, the upper bound on the pairwise error probability in equation (19) can be written by:

$$Pr(X_l \rightarrow X_p) \leq E_{D,U}\left[\exp\left(-\frac{\sum_{k,t=1}^{N_t} \lambda_k \Sigma_t |U_{kt}|^2}{8\sigma^2 \lambda_{max}}\right)\right] \quad (20)$$

$$\leq E_{D,U}\left[\prod_{k=1}^{N_t} \exp\left(-\lambda_k \frac{\sum_{t=1}^{N_t} \Sigma_t |U_{kt}|^2}{8\sigma^2 \lambda_{max}}\right)\right] \quad (21)$$

$$\leq \prod_{k=1}^{N_t} E_{D,U}\left[\exp\left(-\lambda_k \frac{\sum_{t=1}^{N_t} \Sigma_t |U_{kt}|^2}{8\sigma^2 \lambda_{max}}\right)\right] \quad (22)$$

In equations (20)-(22), $U_{kt}$ designates the component of the unitary matrix U at the $k^{th}$ row and $t^{th}$ column. Given the uniform distribution of the experienced losses $\lambda_k$ over the interval $[\lambda_{min}, \lambda_{max}]$, averaging the upper bound in equation (22) over the different values of $\lambda_k$ gives:

$$Pr(X_l \rightarrow X_p) \leq \prod_{k=1}^{N_t} E_U\left[\int_{\lambda_{min}}^{\lambda_{max}} \exp\left(-\lambda_k \frac{\sum_{t=1}^{N_t} \Sigma_t |U_{kt}|^2}{8\sigma^2 \lambda_{max}}\right) P(\lambda_k) d\lambda_k\right] \quad (23)$$

In equation (23), $P(\lambda_k)$ denotes the probability distribution function of $\lambda_k$ and is given by:

$$P(\lambda_k) = \begin{cases} \frac{1}{\lambda_{max} - \lambda_{min}} & \text{if } \lambda_{min} \leq \lambda_k \leq \lambda_{max} \\ 0 & \text{elsewhere} \end{cases} \quad (24)$$

Using the probability distribution function of the experienced losses, equation (23) can be expressed by:

$$Pr(X_l \to X_P) \leq \quad (25)$$

$$\prod_{k=1}^{N_t} E_U \left[ \frac{\exp\left(-\frac{\sum_{t=1}^{N_t} \Sigma_t |U_{kt}|^2}{8\sigma^2}\right) - \exp\left(-\frac{\lambda_{min} \sum_{t=1}^{N_t} \Sigma_t |U_{kt}|^2}{\lambda_{max} \; 8\sigma^2}\right)}{\frac{(\lambda_{max} - \lambda_{min}) \sum_{t=1}^{N_t} \Sigma_t |U_{kt}|^2}{8\sigma^{-2} \lambda_{max}}} \right]$$

$$\leq \prod_{k=1}^{N_t} E_U \left[ \exp\left(-\frac{1}{2}\left(1 + \frac{\lambda_{min}}{\lambda_{max}}\right)\frac{\sum_{t=1}^{N_t} \Sigma_t |U_{kt}|^2}{8\sigma^2}\right) \right. \quad (26)$$

$$\left. 2\sinh\left(\frac{1}{2}\left(1 - \frac{\lambda_{min}}{\lambda_{max}}\right)\frac{\sum_{t=1}^{N_t} \Sigma_t |U_{kt}|^2}{8\sigma^2}\right) \right]$$

Using the approximation of the hyperbolic sine function at high signal-to-noise ratio, the pairwise error probability in equation (26) can be expressed as:

$$Pr(X_l \to X_P) \leq \prod_{k=1}^{N_t} E_U \left[\exp\left(-\frac{\lambda_{min}}{\lambda_{max}}\frac{\sum_{t=1}^{N_t} \Sigma_t |U_{kt}|^2}{8\sigma^2}\right)\right] \quad (27)$$

$$\leq E_U \left[\exp\left(-\frac{\lambda_{min}}{\lambda_{max}}\frac{\sum_{t=1}^{N_t}\sum_{t=1}^{N_t} \Sigma_t |U_{kt}|^2}{8\sigma^2}\right)\right] \quad (28)$$

$$\leq E_U \left[\exp\left(-\frac{\lambda_{min}}{\lambda_{max}}\frac{\sum_{t=1}^{N_t} \Sigma_t}{8\sigma^2}\right)\right] \quad (29)$$

$$\leq E_U \left[\exp\left(-\frac{\|A_{lp}\|^2}{8\sigma^2 MDL}\right)\right] \quad (30)$$

In equation (30), the term MDL corresponds to the value of the mode-depend loss on the optical transmission system given by the ratio between the maximum and the minimum eigenvalues of the channel matrix such that $$MDL = \frac{\lambda_{max}}{\lambda_{min}}.$$

The upper bound in equation (30) is independent of the unitary matrix U, then the pairwise error probability can be upper bounded according to:

$$Pr(X_l \to X_p) \leq \exp\left(-\frac{\|A_{lp}\|^2}{8\sigma^2 MDL}\right) \quad (31)$$

Accordingly, the second term in equation (14) can be upper bounded as:

$$T_2 \leq \sum_{X_l \in C} \frac{1}{\text{card}(C)} \sum_{\substack{X_p \neq X_l \\ A_{lp} \text{non-unitary}}} \exp\left(-\frac{\|A_{lp}\|^2}{8\sigma^2 MDL}\right) \quad (32)$$

Using the properties the minimum Euclidean distance of the code, equation (32) may be equivalently written as:

$$T_2 \leq \left(\frac{1}{\text{card}(C)} \sum_{X_l \in C} N_{2min,l}\right) \exp\left(-\frac{d_{min}^2}{8\sigma^2 MDL}\right) \quad (33)$$

In equation (33), $N_{2min,l}$ designates the number of the codeword matrices in the codebook $c$ having a distance metric to the transmitted codeword matrix $X_l$ equal to $d_{min}$ and being associated with a non-unitary difference codeword matrix. By averaging over all the codeword matrices $X_l$, equation (33) may be simplified as:

$$T_2 \leq \overline{N}_{2min} \exp\left(-\frac{d_{min}^2}{8\sigma^2 MDL}\right) \quad (34)$$

In equation (34), $\overline{N}_{2min,l}$ designates the average number of neighbor codeword matrices associated with a non-unitary difference codeword matrix and a distance metric equal to the minimum Euclidean distance $d_{min}$ of the code.

Combining the results of equations (16) and (34), the decoding error probability in equation (12) may be written as:

$$P_e \leq \overline{N}_{1min} \exp\left(-\frac{d_{min}^2}{8\sigma^2}\right) + \overline{N}_{2min} \exp\left(-\frac{d_{min}^2}{8\sigma^2 MDL}\right) \quad (35)$$

The code construction criterion according to which the set of $N_X$ codeword matrices is determined in step 607 may be based on the minimization of the decoding error probability in equation (35).

According to a first embodiment, the set of codeword matrices may be constructed such that for a predefined space-time coding rate, the effect of the mode-dependent loss MDL on the decoding error probability is minimized. Using the expression of the decoding error probability, it amounts to determine the components of the codeword matrices such that the second term depending on the value of the MDL can be minimized with respect to the first term. Accordingly, the components of the codeword matrices may be determined according to the maximization of the number of pairs of codeword matrices being associated with a unitary codeword matrix and a distance metric equal to the determine minimum distance of the code with respect to the total number of pairs of codeword matrices $N_{pairs}$. This is equivalent to the minimization (respectively the maximization) of the average number $\overline{N}_{2min}$ (respectively $\overline{N}_{1min}$) of neighbor codeword matrices being associated with a non-unitary (respectively unitary) difference codeword matrix and a distance metric equal to the determined minimum Euclidean distance of the code.

In a particular embodiment, the components of the codeword matrices may be constructed such that for a predefined space-time coding rate, the decoding error probability is independent of the mode-dependent loss experienced during the propagation of the optical signal. Using the expression of the decoding error probability, the construction criterion is equivalent to construct the set of codeword matrices such that the second term depending on the value of the MDL can be cancelled. Accordingly, the components of the codeword matrices may be determined according to the maximization of the number of pairs of codeword matrices being associated with a unitary codeword matrix and a distance metric equal to the determine minimum distance of the code, with respect to the total number of pairs of codeword matrices $N_{pairs}$. In addition, in such embodiments, the minimum Euclidean distance may be adapted such that the ratio involving the value of the MDL and $d_{min}$ may be large such that the exponent function in the second term can be approximated by zero. As a result, the average number $\overline{N}_{1min}$ of neighbor codeword matrices associated with a unitary difference codeword matrix is maximized and results in an upper bound of the decoding error probability given by:

$$P_e \leq \overline{N}_{1min} \exp\left(-\frac{d_{min}^2}{8\sigma^2}\right) \tag{36}$$

According to a second embodiment, the set of codeword matrices may be constructed such that for a predefined space-time coding rate and a predefined value of the MDL that can be supported along the optical signal propagation, the decoding error probability is minimized. Accordingly, as in the first embodiment, the set of codeword matrices may be determined such that for a given value of the MDL, the second term in the decoding error probability upper bound is minimized. Accordingly, the set of codeword matrices may be determined such that the average number of the neighbor codeword matrices being associated with a unitary difference codeword matrix and a distance metric equal to the minimum Euclidean distance is maximized. Further, the minimum Euclidean distance may be in such embodiments adapted depending on the value of the mode-dependent loss.

Given the determined set of codeword matrices, step 609 may be performed to encode the received sequence of modulated symbols into a codeword matrix X selected from the determined set of codeword matrices.

An analysis of the decoding error probability of several existing codes has been carried out to validate the performance of the Space-Time coding method, according to some embodiments. In particular, the error performance of the Golden code, the Silver code, the Alamouti code, and the TAST code have been evaluated for different MDL values using a 4-QAM modulation.

Figure 7:
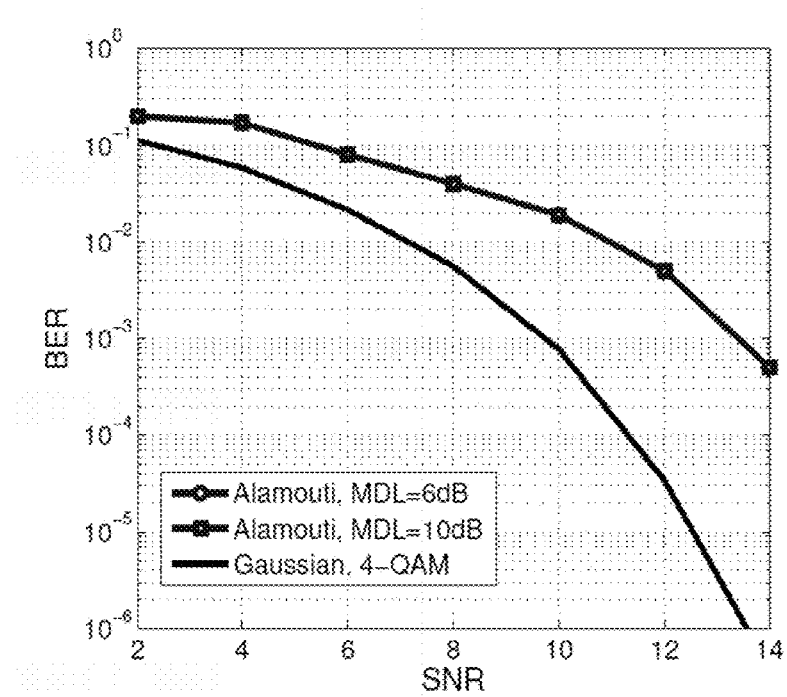
FIG. 7 is a diagram illustrating the Bit Error Rate (BER) performance obtained using the Alamouti code for different values of the mode-dependent loss.

FIG. 7 depicts the Bit Error rate performance as a function of the signal-to-noise ratio (SNR) for a coding scheme using the Alamouti code corresponding to two propagation modes. Two values of the MDL have been considered, MDL=6 dB and MDL=10 dB. The Alamouti code, for 4-QAM modulated symbols has a total number of codewords equal to 8, all of them are associated with a unitary difference codeword since this code is orthogonal. As depicted in FIG. 7, the Alamouti code provides the same error rate performance for the different MDL values. Accordingly, for codes constructed according to the maximization of the average number of neighbor codeword matrices being associated with a unitary difference codeword matrix MDL-free decoding error performance is obtained.

Figure 8:
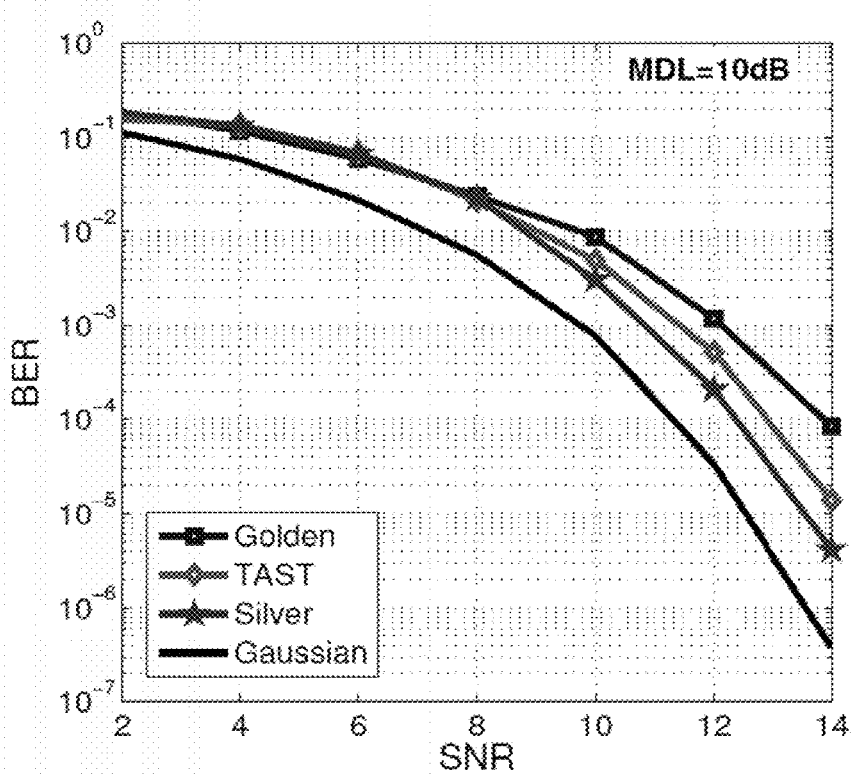
FIG. 8 is a diagram illustrating the Bit Error Rate (BER) performance obtained using the Golden code, the Silver code and the TAST code.

FIG. 8 depicts the Bit Error rate performance obtained for an MDL=10 dB for the Golden code and the Silver code using two (2) propagation modes, and the TAST code for three (3) modes. The Silver, Golden and TAST codes have an average number of neighbor codeword matrices being associated with a unitary difference codeword matrix and a distance metric equal to the minimum Euclidean distance respectively equal to 6.5, 0 and 4. The Silver code is thus outperforming over the Golden and the TAST codes.

Figure 9:
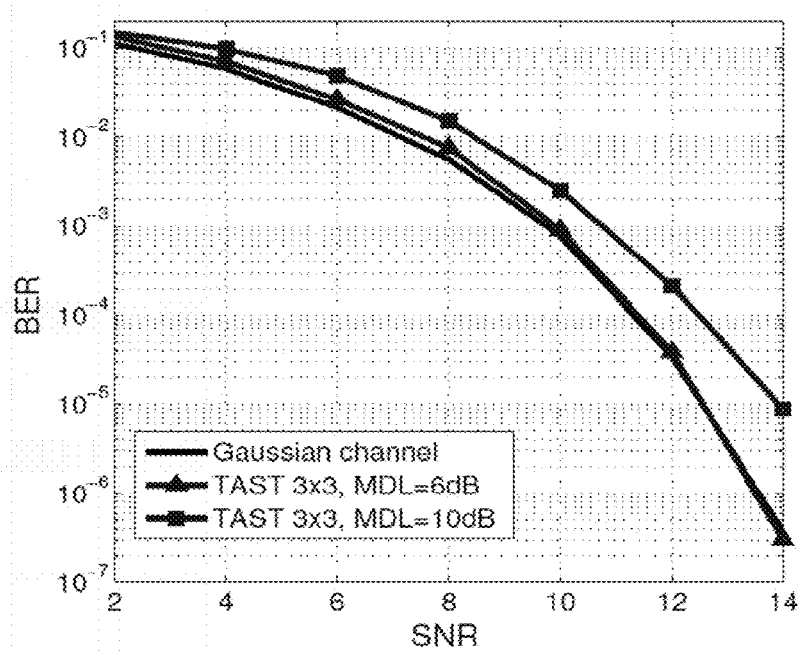
FIG. 9 is a diagram illustrating the Bit Error Rate (BER) performance obtained using the TAST code for different values of the mode-dependent loss.

FIG. 9 depicts the Bit Error rate performance for the TAST code in a 3-modes optical fiber transmission system for different values of the MDL, MDL=6 dB and MDL=10 dB. As the TAST has a same number $\overline{N}_{1min} = \overline{N}_{2min}$, the increase of the MDL value deteriorates the performance as shown through the numerical results.

Further, the efficiency of Space-Time coding for MDL mitigation according to the various embodiments of the invention has been validated through experimental studies performed in laboratory setups producing real end-to-end optical fiber transmissions. Some of the obtained results are reported in FIGS. 10 and 11.

Figure 10:
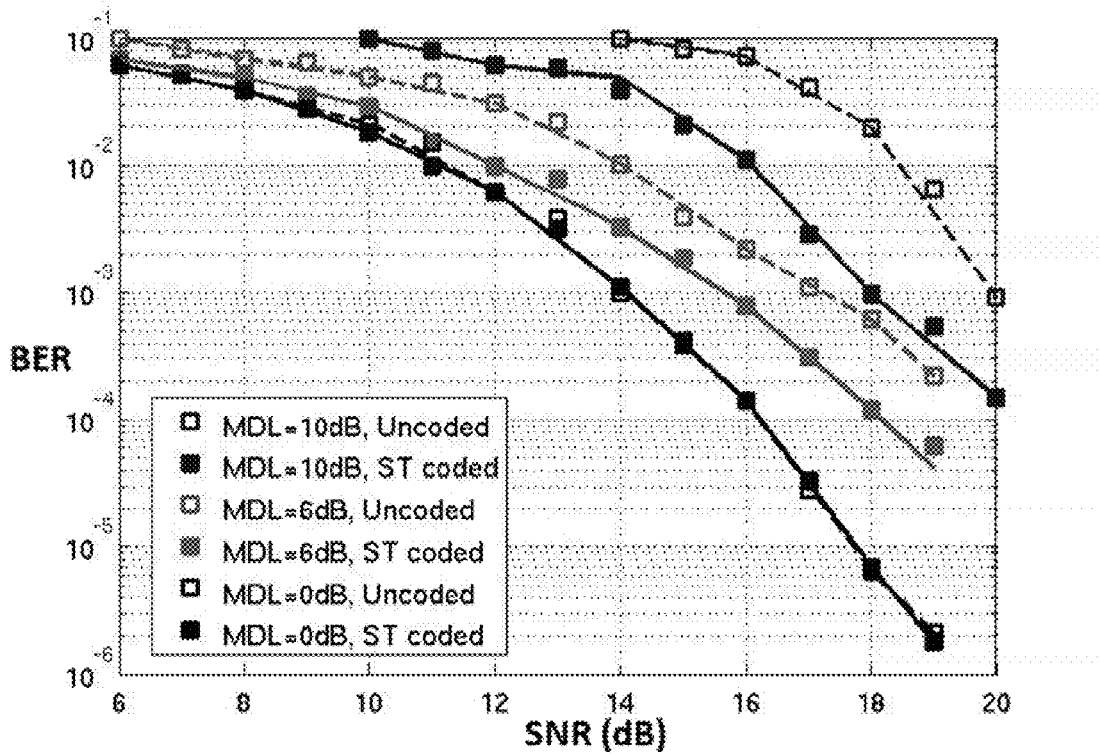
FIG. 10 is a diagram illustrating the Bit Error Rate performance obtained in experimental setups producing a real transmission for uncoded and coded systems and different values of the mode-dependent loss.

FIG. 10 depicts the Bit Error Rate performance obtained in experimental setups producing a real 10-modes optical fiber-based transmission for uncoded and coded systems and different values of the mode-dependent loss, MDL=0, MDL=6, and MDL=10. Plotted experimental results show that Space-Time coded systems outperform uncoded systems. In addition to the coding gain, the Space-Time codes provide mitigation to the mode-dependent-loss.

Figure 11:
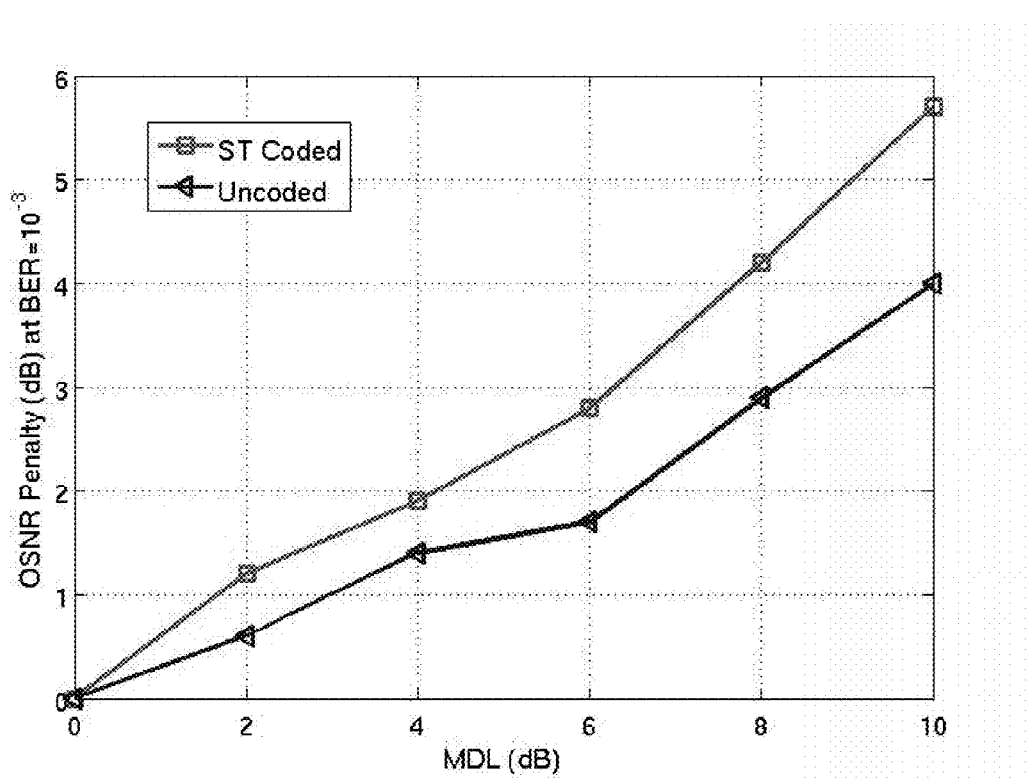
FIG. 11 is a diagram illustrating the Optical Signal-to-Noise Ratio (OSNR) as a function of the mode-dependent-loss obtained in experimental setups producing a real transmission for uncoded and coded systems.

FIG. 11 is a diagram illustrating the Optical Signal-to-Noise Ratio (OSNR) as a function of the mode-dependent-loss obtained in experimental setups producing a real 10-modes optical fiber-based transmission for uncoded and coded systems. The depicted results show that Space-Time coded systems offer OSNR gains over uncoded systems, this gain increasing as the value of the mode-dependent-loss increases.

Although the various embodiments have been detailed in the case of single-core multi-mode fibers in which a single polarization, a single wavelength and single-carrier modulation are used, it should be noted that the invention can also be applied in combination with polarization multiplexing, wavelength multiplexing, and multi-carrier modulation formats.

Further, the invention is not limited to optical communication devices used in communications and may be integrated in a wide variety of optical devices such as data storage equipments and medical imaging devices. The invention may be used in several optical transmission systems used for example in application to automotive industry, in the oil and gas markets, in aerospace and avionics sectors, and sensing applications.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A Space-Time coding device for encoding a digital data sequence according to a predefined space-time coding rate, said data sequence comprising a set of modulated symbols to be transmitted over at least two propagation modes, during a number of time slots, through an optical transmission channel in a single-core multimode optical fiber transmission system, wherein the device comprises:
 a codebook generator configured to determine a set of codeword matrices defining a space-time code represented by a space dimension and a temporal dimension, each codeword matrix comprising complex values and a number of columns equal to said code temporal dimension, and a number of rows equal to said code space dimension, the codebook generator being further configured to associate a difference codeword matrix and a distance metric to each pair of codeword matrices among said set of codeword matrices, each component of a difference codeword matrix associated with a given pair of codeword matrices being equal to the difference between the corresponding components of the codeword matrices of said pair, the distance metric associated with a given pair of codeword matrices being determined by computing the Euclidean norm of the difference codeword matrix associated with said pair, wherein the codebook generator is configured to select the components of the codeword matrices depending on the number of pairs of codeword matrices that are associated with a unitary difference codeword matrix and with a distance metric equal to a given Euclidean distance; and
 an encoding unit configured to encode said set of modulated symbols into a codeword matrix selected from said set of codeword matrices.

2. The Space-Time coding device of claim 1, wherein it further comprises a processing unit configured to determine a set of code parameters, said parameters being chosen in a group consisting of the code temporal dimension, the code space dimension, the number of codeword matrices in said set of codeword matrices, and said given Euclidean distance.

3. The Space-Time coding device of claim 2, wherein the processing unit is configured to determine said code temporal dimension depending on said number of time slots and/or on said predefined space-time coding rate and/or the number of said modulated symbols.

4. The Space-Time coding device of claim 2, wherein said processing unit is configured to determine said code space dimension depending on said selected set of propagation modes.

5. The Space-Time coding device of claim 1, wherein the device is configured to previously select a set of propagation modes from said number of propagation modes according to a mode selection criterion.

6. The Space-Time coding device of claim 1, wherein said codebook generator is configured to select the components of the codeword matrices by maximizing the number of pairs of codeword matrices that are associated with a unitary difference codeword matrix and a distance metric equal to said given Euclidean distance with respect to the total number of possible pairs of codeword matrices.

7. The Space-Time coding device of claim 1, wherein said optical fiber transmission system is associated with a predefined value of the transmission power and/or a predefined value of the mode-dependent loss.

8. The Space-Time coding device of claim 1, wherein said modulated symbols are selected in a set of values depending on a modulation scheme.

9. The Space-Time coding device of claim 8, wherein said processing unit is configured to determine said number of codeword matrices depending on said predefined value of the transmission power and/or on said modulation scheme and/or on said space-time coding rate.

10. The Space-Time coding device of claim 9, wherein said processing unit is configured to determine said given Euclidean distance depending on said predefined value of the mode-dependent loss.

11. An optical transmitter device capable of transmitting a data sequence in an optical communication system, wherein the optical device comprises a Space-Time coding device according to claim 1 configured to encode said data sequence.

12. A receiver device capable of receiving and decoding a data sequence transmitted by an optical transmitter device according to claim 11, wherein it comprises a decoder configured to decode said data sequence over said number of propagation modes.

13. A receiver device capable of receiving and decoding a data sequence transmitted by an optical device according to claim 11, wherein it comprises a decoder configured to decode said data sequence over a set of selected propagation modes lower than or equal to said number of propagation modes.

14. The receiver of any preceding claim 12, wherein said decoder is chosen in a group consisting of a maximum likelihood decoder, a Zero-Forcing decoder, a Zero-Forcing Decision Feedback Equalizer, and a Minimum Mean Square Error decoder.

15. A method of encoding a digital data sequence according to a predefined space-time coding rate, said data sequence comprising a set of modulated symbols to be transmitted over at least two propagation modes, during a number of time slots, through an optical transmission channel in a single-core multimode optical fiber transmission system, wherein the method comprises:
 determining via a codebook generator a set of codeword matrices defining a space-time code represented by a space dimension and a temporal dimension, each codeword matrix comprising complex values and a number of columns equal to said code temporal dimension, and a number of rows equal to said code space dimension, the method further comprises associating a difference codeword matrix and a distance metric to each pair of codeword matrices among said set of codeword matrices, each component of a difference codeword matrix associated with a given pair of codeword matrices being equal to the difference between the corresponding components of the codeword matrices of said pair, the distance metric associated with a given pair of codeword matrices being determined by computing the Euclidean norm of the difference codeword matrix associated with said pair, said step of determining a set of codeword matrices comprising selecting the components of the codeword matrices depending on the number of pairs of codeword matrices that are associated with a unitary difference codeword matrix and with a distance metric equal to a given Euclidean distance;

encoding via an encoding unit said set of modulated symbols into a codeword matrix selected from said set of codeword matrices.

16. A computer program product for encoding a digital data sequence according to a predefined space-time coding rate, said data sequence comprising a set of modulated symbols to be transmitted over at least two propagation modes, during a number of time slots, through an optical channel in a single-core multimode optical fiber transmission system, the computer program product comprising a non-transitory computer readable storage medium, and instructions stored on the non-transitory computer readable storage medium that, when executed by a processor, cause the processor to:

determine a set of codeword matrices defining a space-time code represented by a space dimension and a temporal dimension, each codeword matrix comprising complex values and a number of columns equal to said code temporal dimension, and a number of rows equal to said code space dimension, the processor being further caused to associate a difference codeword matrix and a distance metric to each pair of codeword matrices among said set of codeword matrices, each component of a difference codeword matrix associated with a given pair of codeword matrices being equal to the difference between the corresponding components of the codeword matrices of said pair, the distance metric associated with a given pair of codeword matrices being determined by computing the Euclidean norm of the difference codeword matrix associated with said pair, the processor being caused to select the components of the codeword matrices depending on the number of pairs of codeword matrices that are associated with a unitary difference codeword matrix and with a distance metric equal to a given Euclidean distance; and encode said set of modulated symbols into a codeword matrix selected from said set of codeword matrices.

* * * * *